United States Patent

[11] 3,601,832

[72] Inventor Vernon H. Cook
 R.D. 2, Far Hills, N.J. 07931
[21] Appl. No. 856,603
[22] Filed Sept. 10, 1969
[45] Patented Aug. 31, 1971

[54] AIRCRAFT-WASHING APPARATUS
 16 Claims, 10 Drawing Figs.
[52] U.S. Cl............................................................ 15/21 E,
 15/97
[51] Int. Cl........................................................ B64f 5/00
[50] Field of Search............................................ 15/21 R, 21
 D, 21 E, 50 C, 53, 98, 97

[56] References Cited
 UNITED STATES PATENTS
 3,439,372 4/1969 Collier............................ 15/21 E
 3,460,177 8/1969 Rhinehart et al................. 15/21 E Primary Examiner—Edward L. Roberts
Attorney—Watson, Cole, Grindle & Watson ABSTRACT: Scrubbing self-propelled portable frame guided for longitudinal movement in a horizontal direction, there being a pair of rigid horizontal booms guided on said frame for vertical movement and power means for effecting such movement of the booms simultaneously with the horizontal movement of the frame so that the booms traverse a path having any desired horizontal and vertical components to conform substantially to the longitudinal profile of the aircraft surfaces to be cleaned. Each boom supports a plurality of power-driven scrubbing means for operative engagement with the aircraft surfaces and includes articulated sections adjustable to various angular positions to clean the aircraft fuselage and rudder. An auxiliary boom composed of articulately interconnected sections is carried by and above the main boom and has power means for angularly adjusting its sections so that scrubbing means carried thereby may be positioned for operative engagement with an elevated tail surface of the aircraft. Spray nozzles carried by the respective booms and boom sections are adapted to direct a detergent solution toward the aircraft for washing purposes or, if desired, to direct deicing fluid toward the aircraft for removal of ice and snow therefrom. The scrubbing means of the booms are swingable into and from the path of the spray ejected from the nozzles so as to indirectly deliver the spray onto the aircraft surfaces, when desired, or to permit the spray to impinge directly on the surfaces of the aircraft. A lower, fixed level boom is similarly provided with spray nozzles and power-driven scrubbing means and is adapted for operation on the downwardly directed surfaces of the wing and fuselage of the aircraft.

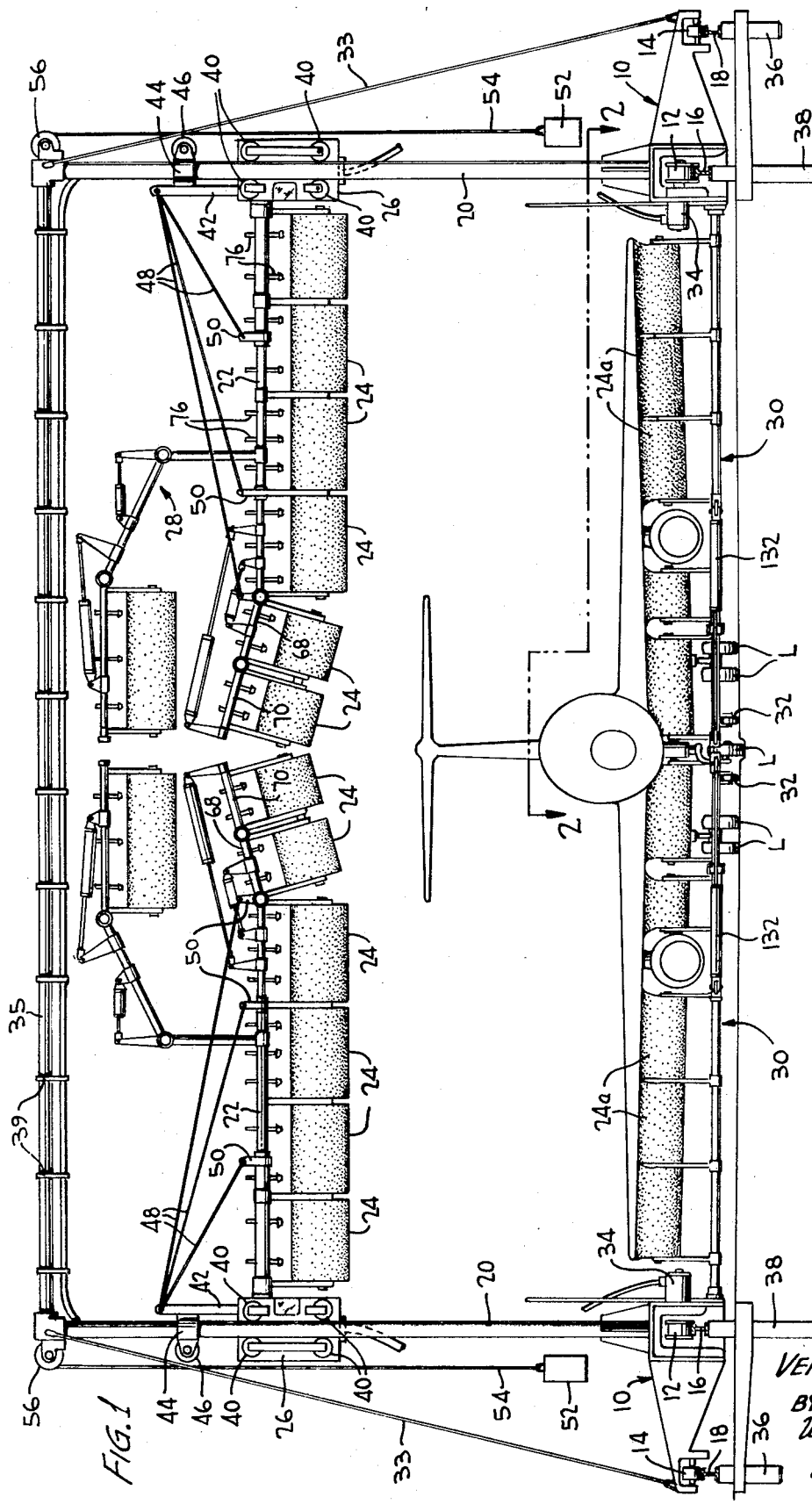

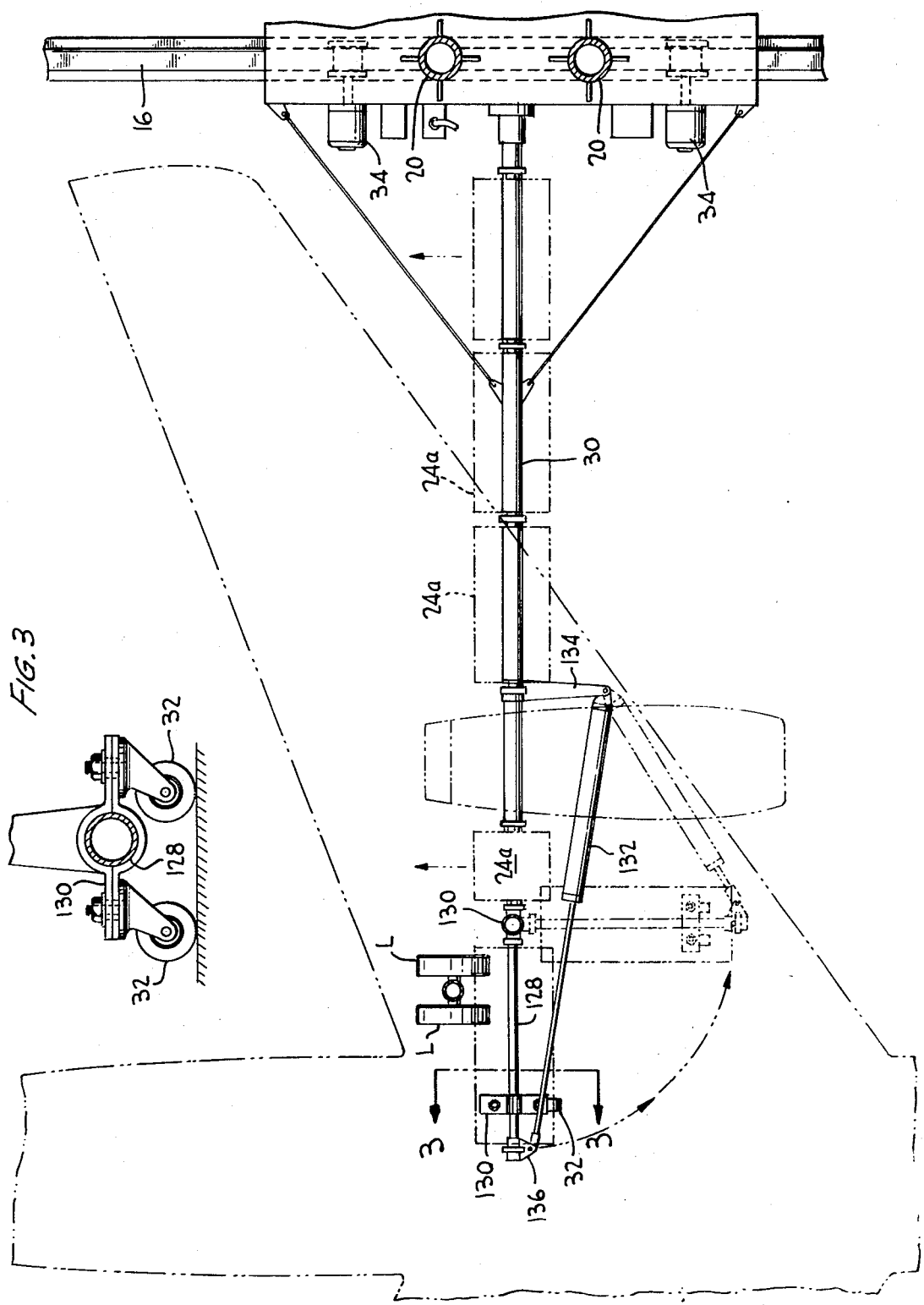

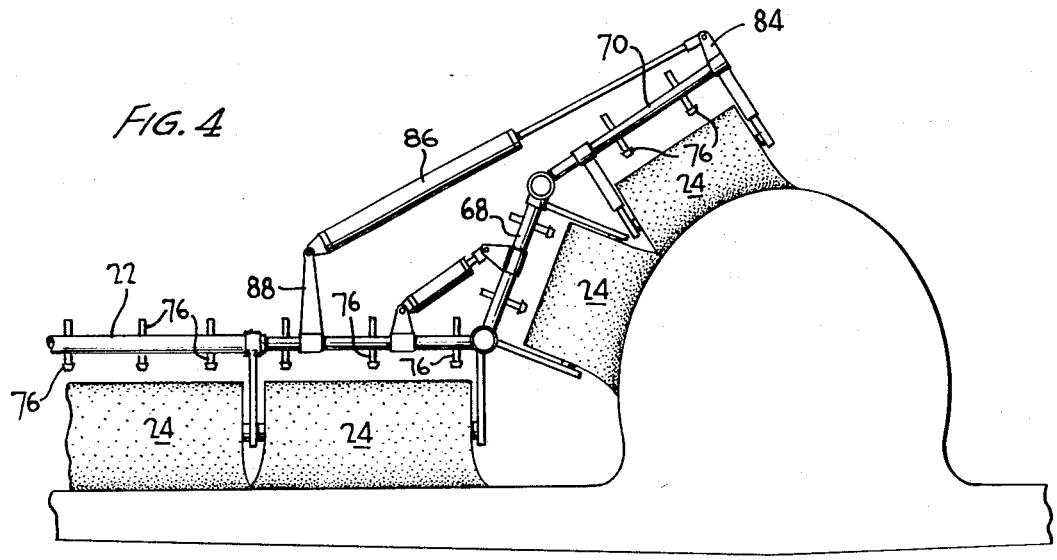
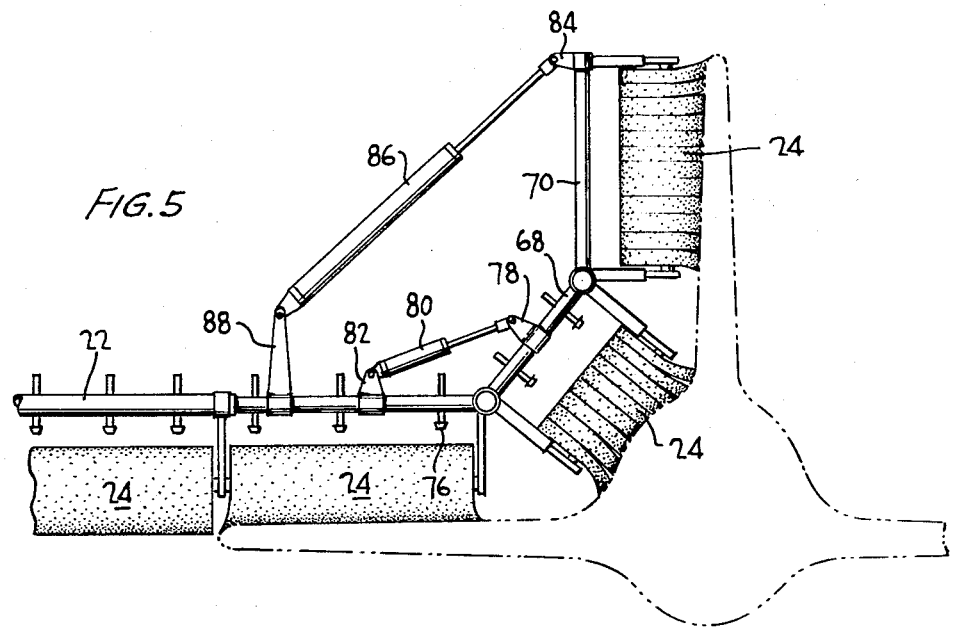

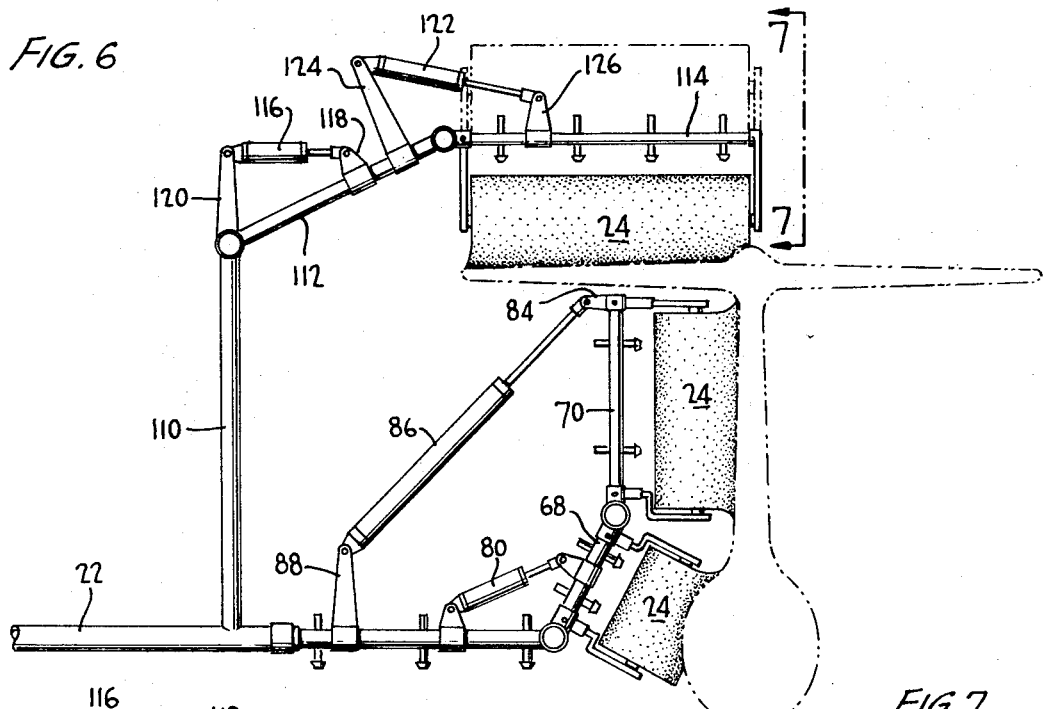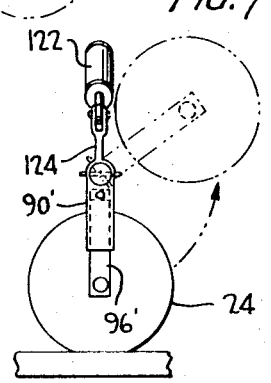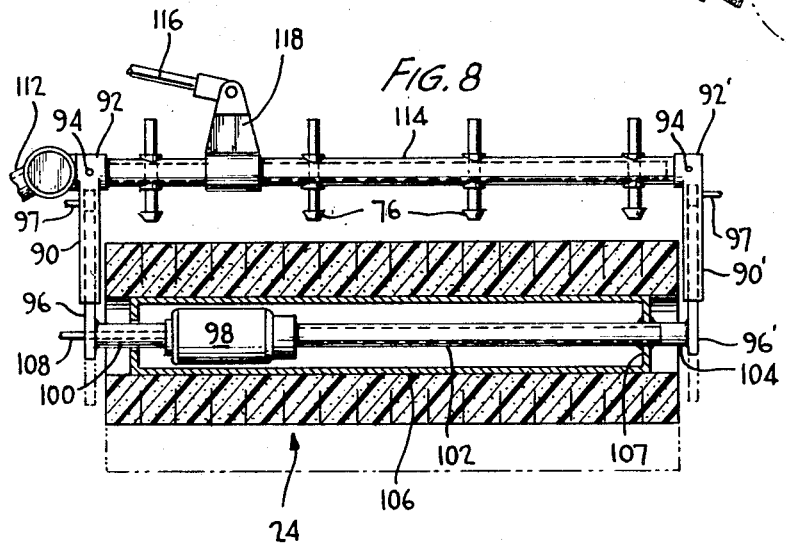

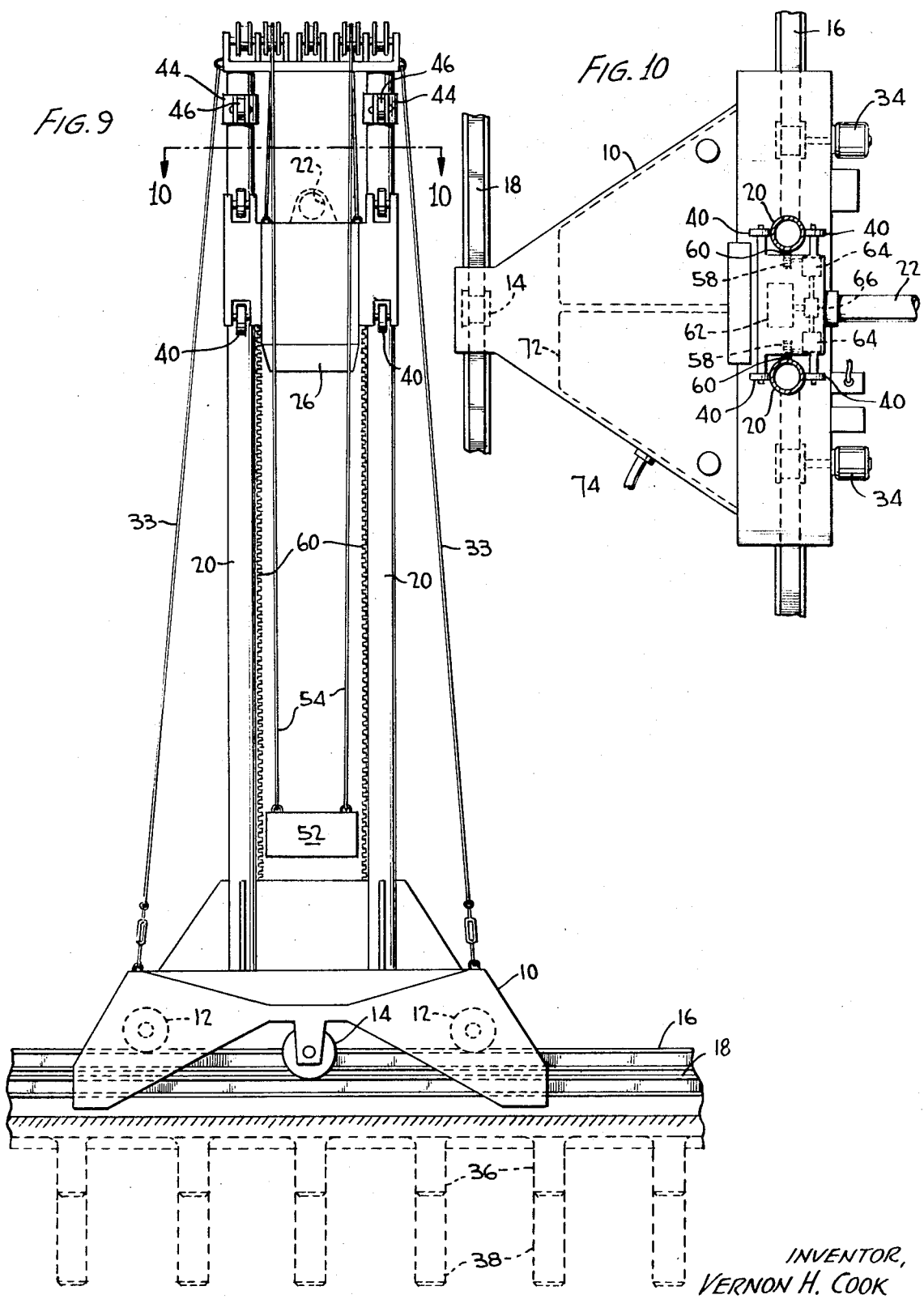

AIRCRAFT-WASHING APPARATUS

This invention relates to improvements in apparatus primarily intended for washing aircraft although adapted also for spraying deicing fluid thereonto. It is well known that apparatus for washing and deicing aircraft as presently used, is of a rather makeshift nature consisting in many instances of adaptations of tree spraying equipment and similar equipment primarily designed for other purposes. Such apparatus has required a good deal of manual labor for its use, together with a considerable amount of time for the washing operation and, of course has tied up expensive aircraft, their crews and passengers for substantial periods of time, all at substantial economic loss.

Contributing to such difficulties and disadvantages is the inherent difficulty in washing aircraft arising from the large expanses of surface to be cleaned, and the wide variations in elevation of such surfaces, which renders it difficult to devise any special apparatus which can improve materially on the performance of the makeshift apparatus above referred to.

With these considerations in mind, it is the primary object of the invention to provide an aircraft washing apparatus for permanent installation at an airport, for the rapid and efficient washing and cleaning of aircraft which may be consecutively positioned at a given washing station to be fully traversed and cleaned by the apparatus which, during the course of a washing operation travels for the full length of the aircraft and has boom-supported means which may be raised and lowered by power during longitudinal movement of the apparatus to thus closely follow the longitudinal profile of the upwardly presented surfaces of the aircraft being washed and also a lower fixed level boom-carrying means for operation on the downwardly presented surfaces of the aircraft being washed. In addition, the main boom may carry an auxiliary boom also adjustable to varying levels and normally supporting spray nozzles and scrubbing means at an elevation appreciably above that of the main boom so as to be adapted for operation on elevated tail surfaces and the like of the aircraft.

The preferred embodiment of the invention is illustrated in the accompanying drawings in which:

FIG. 1 is a front elevation of an apparatus in accordance with the invention arranged for washing an aircraft of more or less conventional configuration;

FIG. 2 is an enlarged cross section on the line 2—2 of FIG. 1;

FIG. 3 is a detail cross section on the line 3—3 of FIG. 2;

FIG. 4 is a greatly enlarged fragmentary elevation of the free end portion of one of the main booms with the articulated sections thereof angularly disposed for operation at the juncture of the wing and fuselage of the aircraft;

FIG. 5 is a view similar to FIG. 4, but showing the parts arranged for operations on the tail structure of an aircraft;

FIG. 6 is a fragmentary elevation of the free end portion of the main boom including the auxiliary boom which is carried thereby, the respective booms being arranged for operation on a tail of an aircraft of the type having greatly elevated tail surfaces;

FIG. 7 is an end elevation as seen from the free end of one of the booms showing a scrubbing element thereof in full lines in its normal operative position to intercept the spray and in broken lines in its retracted positions to permit the spray to impinge directly upon the aircraft surfaces;

FIG. 8 is a section on the line 8—8 of FIG. 7 showing the internal construction of one of the power-driven rotary scrubbing elements;

FIG. 9 is a side elevation of one of the carriages and its upwardly projecting standard constituting the portable frame of the apparatus;

FIG. 10 is a section on the line 10—10 of FIG. 9.

Referring now in detail to the accompanying drawings and first considering the general construction of the preferred form of aircraft-washing apparatus as shown in FIGS. 1 and 2, the apparatus is adapted for washing of an aircraft, generally designated by the letter A in FIG. 1, which is stationed in a predetermined position and remains stationary while the apparatus of the invention moves along over it in a rectilinear path to achieve the washing function.

The apparatus comprises a self-propelled portable frame including the self-propelled carriages 10, 10' supported by the flanged drive wheels 12—12, 14 and means such as the parallel tracks 16, 18 guiding the said frame for rectilinear movement in a preselected horizontal direction. The frame in the preferred embodiment is of composite construction including the upright or vertical spaced pairs of standards 20 projecting upwardly from and carried by each such carriage on opposite sides of the aircraft A outwardly from the wingtips thereof. It will be seen that the said carriages 10 and the frame portions carried thereby as well as the other structure hereinafter described are arranged symmetrically to each other and to a vertical plane passing centrally between the upright standards.

Supported from the respective pairs of standards or uprights 20 in cantilever fashion are a pair of main booms 22 which extend generally horizontally, inwardly toward each other. These booms are supported for vertical movement on the respective pairs of standards 20—20 simultaneously with the horizontal movement of the carriages 10 so that power-driven scrubbing means 24 supported by the booms may be positioned at the proper level for operative engagement with surfaces of the aircraft at different levels thereof as the apparatus progresses longitudinally of the aircraft during the washing operation.

The main booms 22, respectively, are carried in cantilever fashion from control cabins 26 which, in turn, are guided for vertical movement on these standards and which enable the operator or operators to maintain eye-level surveillance of the action of the booms and the scrubbing means associated therewith.

It will be apparent from FIG. 1 that the main booms 22 and auxiliary booms 28 are adapted for operation on the upper surfaces of the wings and tail structure of the aircraft and the upwardly presented portions of the fuselage.

For operation on the downwardly presented wing surfaces and undersurface of the fuselage, there are provided a second set of fixed elevation booms 30 which extend inwardly from the respective carriages 10, being supported therefrom at their outer or relatively remote ends, and supported by the wheels 32 at their relatively adjacent free inner ends for movement at a predetermined height above the ground level. These booms also carry power-driven scrubbing means 24a adapted for operative engagement with the undersurfaces of the wings and fuselage of the aircraft being washed.

As will be best seen in FIG. 1, the standards 20 of each carriage are preferably steadied by guy wires or cables 33 extending from the upper ends thereof to the outboard or outer ends of the carriages 10 and also by means of a connecting wire or cable 35 extending and tensional between the respective upper ends of the standards.

In order to permit utilization of either of the control cabins 26 to control the operation of both the right-hand and left-hand sets of booms, the duplicate sets of controls within the respective cabins are interconnected by suitable wires and conduits 37, which are suspended by hangers 39 beneath the connecting bar 35.

It will be understood that although the illustrated frame of the apparatus is of composite construction embodying two carriages, each with its upright standards and boom structures, the driving motors for propelling the respective carriages are actuated in unison or in coordination with each other so that both of them move as a unit, such coordination being through the medium of the communication conduits and lines 37, above referred to, in FIG. 1. Similarly, the positioning of the vertically adjustable main booms 22 and auxiliary booms 28 will be accomplished in unison, so that these parts will always be positioned symmetrically with respect to each other and to an aircraft on which they are adapted to operate.

Adverting now to a more detailed consideration of the various parts of the apparatus above generally referred to, since such parts are duplicated on the opposite side of the apparatus, it will suffice to describe in detail the parts for but a single side, the parts for the opposite side being designated by similar reference characters. Thus, each self-propelled wheeled carriage 10 has housed therein conventional driving mechanisms as, for instance, an internal combustion engine operating a generator (or alternator), neither of which are visible in FIG. 1, being merely conventional. The generator, in turn, is connected in circuit with electric motors 34 which are in driving relation to the two in-line drive wheels 12—12 on the inboard side of the carriage in guided relation on the inner track 16. The outboard idler wheel or outrigger wheel 14 is similarly guided along the outer tracks 18. Both tracks 16 and 18 are preferably very firmly and strongly supported, as for instance on concrete piers 36, 38 extending well below the surface of the ground.

Guided for vertical movement on and between the upright standard 20—20 of each pair is the control cabin 26 adapted to house an operator together with a full set of controls for the apparatus. The cabin has wheels 40 guiding it for movement on the uprights 20, same being located on either side of the cabin for engagement with each of the two uprights or standards. Also, the cabin is provided with a rigid upright mast 42 having a yoke 44 projecting around each upright and carrying a roller 46 in operative engagement with the upright 20 on the outer side thereof whereby better to support the weight of the cantilever boom 22 which is carried by and projects inwardly from the control cabin. Support of the boom 22 is also provided by guy wires 48 extending diagonally downwardly from the Aircraft of the mast 42 and attached to the boom at various points along its length, via the brackets 50. The weight of the control cabin is substantially counterbalanced by a counterweight 52 suspended from a cable 54 which is guided over a pulley 56 rotatably supported at the upper ends of the uprights or standards. Power means for effecting vertical movement of the boom 32 simultaneously with the horizontal movement of the frame is exemplified by mechanism such as is illustrated and described in my copending application Ser. No. 791,024, filed Jan. 14, 1969, entitled "Aircraft Deicing Equipment" and including a pair of pinions 58, illustrated in FIG. 10, rotatably mounted on the control cabin in meshing engagement with rack gears 60 affixed to the adjacent or inner sides of the respective standards, the pinions 58 being selectively driven through means of hydraulic or electric motor 62 and gear boxes 64, 66 within the control cabin.

As will be apparent from FIG. 1, the main booms 22 are adapted for movement over and in operative association with the wings and tail surfaces of the aircraft as well as the upwardly presented surface portions of the fuselage thereof. In order that they may clear the fuselage and tail of the plane and generally conform to the plane surfaces on both the wings and the fuselage, it is desirable to have the inner end of each boom terminating in a plurality of rigid boom sections 68 and 70 articulately connected to each other and to the main boom section 22 in end-to-end relationship and, in communication with each other and the main boom section, whereby the supply of pressurized cleaning fluid as, for instance, a detergent solution delivered into the main boom section 22 from a pressurized source, such as a tan 72 (FIG. 10) within the associated carriage and delivered to the booms through a flexible hose 74, may be discharged through a series of spray discharge nozzles 76 carried by the boom and its various sections at relatively spaced locations along the boom. Preferably all of the nozzles are directed substantially vertically downwardly in a common plane.

For effecting relative angular adjustment between the articulately interconnected sections of the main boom, there are provided power means such as the hydraulic piston and cylinder units (best shown in FIGS. 4 and 5) interconnected between the boom sections which are to be relatively adjusted. Thus in the preferred embodiment each boom includes the main boom section 22 and the two relatively articulately connected free end extensions 68 and 70 thereof, of which the innermost extension 68 is provided with an upwardly projecting bracket 78 which is connected by the piston and cylinder unit 80 to a similar bracket 82 n the main boom section 22. In the same manner the outer or free section 70 is provided with a bracket 84 at its free end which is connected by the extensible and contractable power means in the form of a hydraulic piston and cylinder unit 86 to a similar bracket 88 rigidly affixed to the main boom section. It will thus be seen that both of the articulated boom sections 68, 70 are angularly adjustable with respect to the main boom section and to each other, the articulated connections or pivots between the boom sections being such as to permit their relative angular movement in a vertical plane. With this arrangement, the articulated free and sections of the boom may be made to conform rather closely to the profile of the aircraft at the juncture of its fuselage and wings, whereby the scrubbing means and spray nozzles may be brought into positions closely adjacent to the wings and fuselage of an aircraft.

Further, in accordance with the invention, each boom carries a suitable plurality of power-driven scrubbing means 24 which are supported by the main boom as well as by each of the articulated boom end sections. Such scrubbing means 24 are preferably of cylindrical shape rotatable about their axes for operative engagement with the aircraft surfaces to be scrubbed. They may comprise brushes or spongelike resiliently deformable material such as foam rubber or plastic foam. Each of the articulated free end portions 68 and 70 of the boom carries its own scrubbing means 24 for rotation about an axis parallel to that of the boom or boom section, and in spaced relation thereto, the arrangement being generally similar to that of the scrubbing means carried by the main boom section.

In FIGS. 1 through 5 of the drawings, the scrubbing means 24 are positioned or disposed to intercept the spray from the spray discharge nozzles 76 and thus to indirectly deliver such spray onto the surface of the aircraft to be cleaned or deiced. However, it may be desirable under some circumstances, to permit the nozzle to eject spray directly onto the surfaces to be cleaned or deiced and to this end, referring to FIG. 8, each of the various rotary scrubbing means or elements 24 is supported between the free ends of relatively spaced rigid brackets 90, 90', the inner ends of which comprise bearing portions 92, 92' rotatably journaled on their associated sections of the boom for swinging adjustment about the longitudinal axis thereof. By means of locking pins 94 inserted in suitably positioned openings in the bearing ends of the brackets and in the adjacent portions of the boom, each of the rotary scrubbing elements 24 may be operatively positioned in the path of the spray emanating from the spray nozzles 76 of their associated boom section, for operative engagement with the aircraft surface, all as shown in full lines in FIG. 7, or else each such rotary scrubbing element may be swung to a retracted position as shown in broken lines in FIG. 7, and positioned therein by the locking pin 94, in which position the spray nozzles will deliver their spray directly onto the adjacent surface of the aircraft. Such arrangement may be particularly desirable where deicing liquid is being delivered through the spray nozzles 76, although where the apparatus of the invention is being used primarily for washing dirt from the aircraft surfaces, it will generally be desired to employ the rotary power-driven scrubbing means 24 which, in such event, will be operatively positioned as shown in full lines in FIG. 7.

Preferably the brackets 90, 90' which support each scrubbing element 24 are longitudinally extensible so that the element may move with respect to the boom to be pressed into operative engagement with the aircraft, and independent such movement of the several scrubbing elements may cause them jointly to assume a profile conforming to that of the aircraft surfaces engaged by them at any given time.

For these purposes, and as shown in FIG. 8, each bracket 90, 90' is formed to define an outwardly opening cylinder which slidably receives one end of a plunger 96, 96', constituting the free end portion of the bracket. The plungers 96, 96' are urged out of their respective cylinders and retracted thereinto, by fluid supplied and withdrawn through the tubes 97.

The hydraulic motor 98 for each scrubbing element 24 is affixed to and supported from the plunger 96 of one of the brackets 90 by means of a stationary tubular stub shaft 100 aligned with the rotary output shaft 102 of the motor. The free end of the output shaft 102 is rotatably journaled in a sleeve bearing 104 carried by the plunger 96' of the other bracket 90'.

The hub 106 of the rotary scrubbing element 24 is in the form of a hollow cylinder which encompasses the hydraulic drive motor 98 and its output shaft 102. One end of the cylinder 106 is affixed, as by welding 107, to the output shaft 102, to transmit rotation from that shaft to the scrubbing element 24, while the other end of the cylinder 106 is rotatably journaled on and supported by the stub shaft 100.

A pressurized driving fluid from any suitable source is delivered to the hydraulic motor 98 through a tubing 108 shown fragmentarily in FIG. 8, and discharged through the tubular shaft 102 and bearing 104.

AUXILIARY BOOM

The main boom 22, as hereinbefore described, and its associated spraying and scrubbing means are intended primarily for operation on the upwardly presented surfaces of the aircraft wings and fuselage and, in the case of many conventional aircraft, with the tail surfaces thereof. However, in the case of an aircraft having an elevated tail structure as shown in FIG. 1, it is desirable to provide an auxiliary boom 28 supported from the main boom 22 at a level appreciably thereabove, thereby minimizing the amount of vertical movement required of the main boom in order to operate on all of the surfaces of the aircraft.

Thus, referring to FIGS. 1 and 6, it will be seen that the auxiliary boom 28 in the preferred embodiment comprises an upright boom section 110, rigidly affixed to the main boom 22 medially of its length and a pair of articulated boom sections 112, 114, pivotally connected to each other and to the upright boom sections. For adjusting the angle between the upright boom section 110 and the adjoining boom section 112, there is provided a piston and cylinder unit 116 interconnected between brackets 118 and 120 on said boom sections. Similarly, for adjusting the vertical angle between the two articulated boom sections 112, 114, there is provided a similar arrangement of extensible and contractable piston and cylinder unit 122 interconnected between brackets 124 and 126 on such boom sections. In this arrangement only the articulated boom sections carry spray nozzles 76 and rotary scrubbing elements 24. It will be seen that these articulated boom sections may be adjusted by means of their hydraulic units to any of a variety of operating levels above the level of the main boom to thus expeditiously engage an elevated tail surface (as illustrated in FIG. 6) such as may be employed on any various types and styles of aircraft. It will be understood that the spray nozzles 76 and the rotary scrubbing elements 24 of the auxiliary boom sections are arranged and driven similarly to those hereinbefore described in connection with the main boom.

LOWER BOOM

For cleaning and/or applying deicing fluid to the underside of the fuselage and wing structure, there are provided the fixed level lower horizontal booms 30 (FIGS. 1 and 2) located below the main boom 22, just above ground level. Each fixed level lower boom is of hollow tubular construction so that it may serve as a fluid conduit in the same manner as the main boom, and is provided with a plurality of upwardly directed spray discharge nozzles 76 communicating with its interior to receive a pressurized fluid therefrom and to direct it upwardly toward the lower surfaces of the aircraft wing and fuselage.

Similarly, the fixed level lower boom 30 carries thereabove a plurality of scrubbing means consisting of scrubbing element 24a similar to those heretofore described in connection with the main boom. These are normally disposed in the path of the spray discharged through the nozzles 76 for delivering said spray onto the undersurface of the wing and fuselage incident to the scrubbing action thereon of the scrubbing elements.

As is the case with the scrubbing elements of the main boom, the several scrubbing elements 24a of the lower boom are individually vertically adjusted by means of their extensible and contractable hydraulically actuated brackets 90, 90' which are in all respects similar to those hereinbefore described except that they are directed upwardly rather than downwardly. It will thus be apparent that the action of these hydraulic extensible and contractable brackets 90, 90' will be, when they are extended by fluid pressure within the cylinders, to urge the brushes upwardly and press them into operative engagement with the undersurface of the aircraft.

In order that the free inner ends of the two fixed lines in booms 30 may move past the landing gear of the aircraft, the inner end of the boom is formed to include an articulated extension 128 which is swingable horizontally about a pivot 130, under the actuation and control of a conventional piston and cylinder unit 132 interconnected between a bracket 134 on the main portion of this boom and a further bracket 136 on the free end of the articulated extension. Thus by suitable actuation of the hydraulic piston and cylinder unit, the articulated extension may be positioned either in alignment with the remainder of the boom as illustrated in full lines in FIG. 2, or it may be withdrawn to a retracted position substantially at right angles to the remainder of the boom as shown in broken lines in FIG. 3, whereby it may clear the landing wheels or gear of the aircraft and move freely therepast.

It is desirable that the inner free ends of the fixed level lower booms be supported against downward deflection, for which purpose there are provided suitable caster wheels 32 supported at the lower ends of legs 138 which, in turn, depend from the articulated extensions of the respective booms.

OPERATION

In the operation of the apparatus, with the framework disposed at one end of its range of operative horizontal movement, an aircraft is taxied to a predetermined position between the opposed pairs of standards 20—20 with the vertical longitudinal plane of symmetry of the aircraft substantially coincident with the vertical plane of symmetry of the apparatus, and with either the nose or tail of the aircraft positioned in the path of horizontal advancement or movement of the apparatus. The drive motors 34 for the driving wheels 12 are then placed in synchronous operation so that both carriage 10 and the structure supported thereby advance simultaneously and abreast of each other down the tracks 16, 18, the horizontal main booms 22 and their articulated portions 68, 70 being adjusted progressively as to their vertical levels and their angular relationships to cause the scrubbing means 24, 24a to operatively engage the various upper and lower surfaces of the aircraft fuselage, wings, tail and rudder. The auxiliary booms 28 are similarly to be angularly adjusted to engage the appropriate surfaces by the scrubbing elements in passing thereover, the angular adjustment being such as to cause the various scrubbing means 24 to pursue paths conforming to the longitudinal contour of the respective aircraft surfaces which they engage.

The lower or fixed level boom 30 will have its brushes or scrubbing elements 24a individually projected upwardly by the extensible hydraulically actuated brackets to be thus pressed into operative scrubbing engagement with the lower surfaces of the aircraft wings, fuselage and tail in passing therebeneath.

Where the apparatus is used for conducting the washing operations to remove dirt from the aircraft surfaces, the brushes or scrubbing elements 24, 24a will normally be employed in the manner above described, while a suitable detergent solution is ejected or expelled from the various spray nozzles 76 and on to the rotary scrubbing means to loosen and assist the scrubbing means in removal of dirt, dust and foreign matter.

However, where the apparatus is to be employed for deicing purposes, it may or may not be desired to employ the scrubbing means of the invention. Where such scrubbing means and their action is not desired, such scrubbing means may be swung or retracted to inoperative positions as illustrated in broken lines in FIG. 7 of the drawings. In such event, the vertically movable main booms and auxiliary booms may be vertically adjusted to bring their respective spray nozzles into close proximity with the surfaces of the aircraft to be sprayed, to direct spray thereon in concentrated form, whereby to perform an effective deicing function. If desired, after the deicing liquid has been sprayed onto the aircraft while the scrubbing means are retracted, the scrubbing means may then be swung to operative position and the apparatus may be caused to make a return pass or sweep over the aircraft with the scrubbing means operatively engaging same to mechanically remove the ice and snow therefrom.

It will thus be apparent that either the spraying action alone or the scrubbing action alone may be employed to advantage and, of course, the two may be employed together in conjunction with each other, especially where the function is primarily that of cleaning or washing the aircraft.

Having thus described my invention, I claim:

1. In an aircraft-washing apparatus, the combination comprising:
   a self-propelled portable frame,
   means guiding sad frame for movement in a preselected horizontal direction,
   a rigid generally horizontal boom guided on said frame for vertical movement,
   power means for effecting vertical movement of said boom simultaneously with the horizontal movement of said frame
   power-driven scrubbing means and spray discharge nozzles supported by said boom,
   said boom comprising a plurality of articulately interconnected rigid sections, power means being interconnected between adjoining said sections for effecting relative angular adjustment between said sections, said nozzles and said scrubbing means being carried by the respective said sections.

2. Aircraft-washing apparatus as defined in claim 1, in which each said scrubbing means includes a fluid drive motor, there being a common source of pressurized fluid communicating with said fluid drive motor and with said spray nozzles.

3. Aircraft-washing apparatus as defined in claim 1, including an auxiliary boom and means supporting said auxiliary boom from said first-mentioned boom, at a level above that of the first-mentioned boom.

4. Aircraft-washing apparatus as defined in claim 3, including power-driven scrubbing means supported by said auxiliary boom.

5. Aircraft-washing apparatus as defined in claim 1, in which said boom is of tubular construction defining a fluid conduit in communication with said nozzles.

6. Aircraft-washing apparatus as defined in claim 5, in which said frame comprises an upright standard, said generally horizontal boom being guided for vertical movement on said standard and supported in cantilever fashion therefrom.

7. Aircraft-washing apparatus as defined in claim 6, in which said boom comprises a plurality of articulately interconnected rigid tubular section in fluidtight communication with each other, and power means for effecting relative angular adjustment of adjoining said sections, there being a plurality of said scrubbing means carried by the respective said boom sections.

8. Aircraft-washing apparatus as defined in claim 1, in which said nozzles of each boom section are all directed in a common plane parallel to said boom section, said scrubbing means for the respective boom sections being mounted for rotation about axes parallel to said respective sections and swingable about said sections into and from the paths of the spray emanating from said nozzles.

9. In an aircraft-washing apparatus, the combination comprising:
   a self-propelled portable frame,
   means guiding said frame for movement in a preselected horizontal direction,
   a rigid generally horizontal boom guided on said frame for vertical movement,
   power means for effecting vertical movement of said boom simultaneously with the horizontal movement of said frame;
   power-driven scrubbing means supported by said boom,
   said scrubbing means comprising a fluid-driven motor rigidly supported from said boom, a rotary output shaft, and a cylindrical hollow scrubbing element coaxially carried by said shaft for rotation therewith, said motor being encompassed within said cylindrical hollow scrubbing element.

10. Aircraft-washing apparatus as defined in claim 9, including rigid brackets connected to the boom for angular adjustment therearound and having free ends projecting outwardly from the boom, said scrubbing means being carried at the free ends of said brackets, and means for selectively maintaining said brackets in various positions of angular adjustment around said boom.

11. Aircraft-washing apparatus as defined in claim 10, in which said brackets are longitudinally extensible and contractable for varying the distance of the scrubbing means from the boom.

12. Aircraft-washing apparatus as defined in claim 11, in which said brackets respectively comprise fluid-actuated piston and cylinder units.

13. In an aircraft-washing apparatus, the combination comprising:
   a self-propelled portable frame,
   means guiding said frame for horizontal rectilinear movement,
   a horizontal boom carried in cantilever fashion by said frame and extending transversely to the movement of said frame,
   said boom comprising a plurality of rigid sections articulately interconnected for relative swinging movement in a horizontal plane,
   spray nozzles and power-driven scrubbing means carried by the respective said sections.

14. An aircraft-washing apparatus as defined in claim 13, including a pair of said horizontal booms supported from said frame in alignment with each other, the relatively adjacent ends of said booms being free, and the relatively remote ends of said booms being connected to said frame, said free ends being defined by horizontally swingable boom sections, and power means for horizontally swinging said boom sections from positions in alignment with each other to retracted positions generally parallel to each other.

15. Aircraft washing apparatus as defined in claim 14, including ground wheels rotatably connected to said last mentioned horizontally swingable boom sections and supporting same for movement at predetermined levels.

16. In an aircraft-washing apparatus, the combination comprising:
   a self-propelled portable frame,
   means guiding said frame for movement in a preselected horizontal direction,
   a rigid generally horizontal boom guided on said frame for vertical movement,
   power means for effecting vertical movement of said boom simultaneously with the horizontal movement of said frame;

power-driven scrubbing means supported by said boom; a plurality of spray discharge nozzles carried by said boom, said scrubbing means being disposed to intercept the spray discharged through said spray discharge nozzles; said scrubbing means being mounted on the boom for selective positioning either in or to one side of the path of the spray emanating from said spray nozzles.